(12) United States Patent
Wawrzynski

(10) Patent No.: US 11,292,549 B2
(45) Date of Patent: Apr. 5, 2022

(54) TWO-WHEELED BICYCLE WITH VARIABLE CONFIGURATION

(71) Applicant: Pawel Wawrzynski, Falenty Nowe (PL)

(72) Inventor: Pawel Wawrzynski, Falenty Nowe (PL)

(*) Notice: Subject to any disclaimer, the term of this patent is extended or adjusted under 35 U.S.C. 154(b) by 74 days.

(21) Appl. No.: 16/967,832

(22) PCT Filed: Feb. 16, 2019

(86) PCT No.: PCT/IB2019/051265
§ 371 (c)(1),
(2) Date: Aug. 6, 2020

(87) PCT Pub. No.: WO2019/159140
PCT Pub. Date: Aug. 22, 2019

(65) Prior Publication Data
US 2021/0031862 A1    Feb. 4, 2021

(30) Foreign Application Priority Data

Feb. 16, 2018    (PL) .......................................... 424613

(51) Int. Cl.
*B62K 13/08*    (2006.01)
*B62J 1/28*    (2006.01)
(Continued)

(52) U.S. Cl.
CPC ................. *B62K 13/08* (2013.01); *B62J 1/28* (2013.01); *B62K 3/005* (2013.01); *B62K 19/18* (2013.01);
(Continued)

(58) Field of Classification Search
CPC ........ B62K 13/08; B62K 13/00; B62K 3/005; B62K 19/18; B62K 21/18
(Continued)

(56) References Cited

U.S. PATENT DOCUMENTS

| 6,497,426 B2* | 12/2002 | VanPelt | B62K 3/005 |
| | | | 280/287 |
| 10,513,304 B2* | 12/2019 | Thomson | B62M 5/00 |
| 2006/0273543 A1* | 12/2006 | Jong | B62K 13/00 |
| | | | 280/278 |

FOREIGN PATENT DOCUMENTS

DE    29911911 U1    11/1999
DE    202004006607 U1    9/2004
(Continued)

OTHER PUBLICATIONS

International Search Report of PCT/IB2019/051265, dated May 9, 2019.

*Primary Examiner* — Kevin Hurley
*Assistant Examiner* — Hosam Shabara
(74) *Attorney, Agent, or Firm* — Mark M. Friedman

(57) ABSTRACT

A two-wheeled, variable configuration bicycle having a frame, a handlebar, a saddle, pedals with pedal cranks and a drive gear rotatably mounted on the frame, a front wheel mounted on the front fork, a rear wheel with a sprocket mounted on a rear fork. The bicycle includes the upright configuration and the recumbent configuration, and in recumbent configuration, the bicycle provides support for the back of the cyclist. The frame (2, 2') are provided two front mounting locations for attaching the front fork (14), wherein the first front mounting location is provided for attaching the front fork (14) in the upright configuration, and the second front mounting location is provided for attaching the front fork (14) in the recumbent configuration. The frame (2, 2') are provided two rear mounting locations for attaching the rear fork (17).

14 Claims, 10 Drawing Sheets

Figure 1:
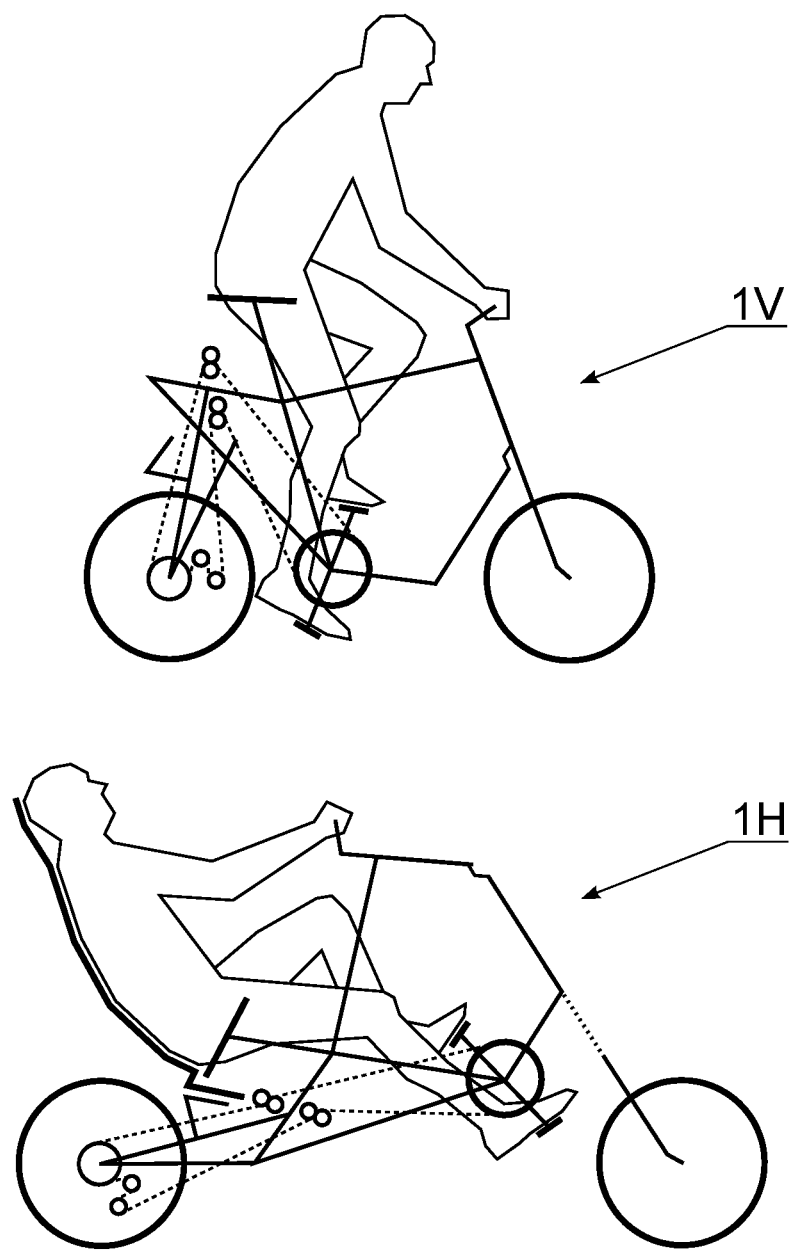

(51) Int. Cl.
*B62K 3/00* (2006.01)
*B62K 19/18* (2006.01)
*B62K 21/18* (2006.01)
*B62M 9/00* (2006.01)
*B62M 9/16* (2006.01)
*B62M 11/00* (2006.01)

(52) U.S. Cl.
CPC ............... *B62K 21/18* (2013.01); *B62M 9/00* (2013.01); *B62M 9/16* (2013.01); *B62M 11/00* (2013.01); *B62K 3/00* (2013.01)

(58) Field of Classification Search
USPC ....................................... 280/7.1, 7.11, 288.1
See application file for complete search history.

(56) References Cited

FOREIGN PATENT DOCUMENTS

| | | | | |
|---|---|---|---|---|
| DE | 102004020376 | A1 * | 11/2005 | ............. B62K 13/00 |
| DE | 202008009909 | U1 * | 10/2008 | ............. B62K 13/00 |
| GB | 2439937 | A | 1/2008 | |
| GB | 2541699 | A | 3/2017 | |
| WO | 2005047093 | A1 | 5/2005 | |
| WO | 2005105560 | A1 | 11/2005 | |

* cited by examiner

TWO-WHEELED BICYCLE WITH VARIABLE CONFIGURATION

The object of the present application is a two-wheeled bicycle with variable configuration.

A two-wheeled bicycle, i.e. a single-track vehicle, is most often adapted to ride in such a way that the cyclist is sitting on the saddle holding the handlebar with his hands, the back of the cyclist is not supported, and the cyclist's trunk takes a basically vertical position, Nowadays, constructors have modified the classic design of the bicycle in such a way that the cyclist, while driving, assumes a semi-recumbent or even lying position, while the back of the cyclist is supported. This position of the cyclist is characterized by a better coefficient of the frontal aerodynamic resistance and the cyclist can achieve higher speeds. To distinguish, in this description, the classic position of the cyclist will be called the upright position, and the position in which the back of the cyclist is supported in a lying or semi-recumbent position will be called the recumbent position, respectively the configuration of the bicycle for the classic position of the cyclist will be called the upright configuration while the bicycle configuration for the position lying or semi-recumbent will be called the recumbent configuration.

Known in the state of the art are the bicycles which can be adapted for driving in the upright or recumbent configuration.

The international publication WO2010012622 presents a bicycle having rigid frame the shape of which allows the use of a bicycle in both configurations. Depending on the configuration, the position of the saddle and the drive is different, i.e. the pedals with their hub and the tethered drive wheel. The disadvantage of this solution is the high weight of the vehicle because all parts of the frame remain on the assembled bicycle regardless of the configuration used.

Patent application US2001045724 discloses a bicycle having a frame consisting of two parts that can be folded together in two different ways to obtain an upright or recumbent configuration. The disadvantage of this solution is that the bicycle's conversion from recumbent to upright configuration and vice versa is complicated and time-consuming.

U.S. Pat. No. 5,951,034 describes a set for converting to some extent an upright bicycle to a recumbent one but such a modification is time-consuming and complicated.

Patent application GB2439937 describes a bicycle having a frame, handlebar and saddle which are constructed of a plurality of variable length elements that can be connected at different angles one to another. Depending on the length of the elements and the angles between the elements, the bicycle can be folded as a recumbent or upright bicycle. The disadvantage of this solution is the limited stiffness of the frame composed of many moving parts and, moreover, the process of the bicycle conversion from recumbent to upright and vice versa is complicated.

Patent application DE102004020376 discloses a bicycle that can be used in a recumbent or upright configuration due to the variable position of the rear wheel and the pedal hub relative to the bicycle frame.

Utility model DE202014000137 presents a bicycle that can be used as upright or recumbent thanks to the variable position of the pedal hub and the possibility of tilting the handlebar and the front fork relative to the bicycle frame.

Patent application GB2541699 presents a three-wheeled bicycle on which it is possible to ride in an upright and near-recumbent position by changing the geometry of the quadrangular frame.

Patent application US20120012413 discloses a three-wheeled bicycle on which it is possible to ride in a sitting position and similar to a recumbent one by way of changing the frame geometry.

The present invention discloses a bicycle with a different design from those known in state of the art, namely one in which the frame is positioned in the same manner with respect to the cyclist in both an upright and recumbent configuration. In each configuration the bicycle frame takes a different position, i.e. it is turned in the axis designated by the hips of the cyclist. Depending on the configuration, the wheels are attached accordingly.

The subject of the invention is a two-wheeled bicycle with a variable configuration having a frame, a handlebar, a saddle, pedals with pedal cranks and a driving gear rotatably mounted on the frame, a front wheel mounted on the front fork, a rear wheel with a driven sprocket mounted on the rear fork, wherein the configurations of the bicycle include an upright configuration and a recumbent configuration, and a backrest for the cyclist in the recumbent configuration is provided. The bicycle according to the invention is characterized in that two front mounting locations for fastening the front fork are provided on the frame, wherein the first front mounting location is provided for attaching the front fork in an upright configuration and the second front mounting location is provided for mounting the front fork in the recumbent configuration, and in that two rear mounting locations for attaching the rear fork are provided on the frame, wherein the first rear mounting location is provided for attaching the rear fork in the upright configuration, and the second rear mounting location intended for fastening the rear fork in the recumbent configuration.

The bicycle according to the invention has a mounted steering mechanism including two rotary elements coupled to each other by means of a coupling mechanism, the first rotary element being rigidly connected to the handlebar and being the first front mounting location and the second rotary element being located further away from the handlebar than the first rotary element and providing the second front mounting location.

The coupling mechanism of the steering mechanism is constructed in the form of a gearing including bevel gears.

In the bicycle according to the invention, in one of configurations, the front fork is adapted to be fastened to one front mounting location indirectly by means of an extension element, and, in another configuration, the front fork is adapted to be fastened directly to the second front mounting location.

The first front rotary element of the coupling mechanism is in the form of a tube.

The second rotary element of the coupling mechanism is in the form of a tube.

The extension piece used in the bicycle is in the form of a tube.

In the bicycle according to the invention, the first rotary element and the second rotary element are arranged one relative to another at an angle in the range of 30° to 90°.

In the bicycle according to the invention, the tethered drive gear is connected to the tethered gear driven with one chain, the gears being mounted on the frame to change the direction of the chain.

In the bicycle according to the invention, the tethered drive gear is connected to a tethered gear driven by means of two chains, wherein a double gear is mounted on the frame for transferring the drive from the chain that surrounds the drive gear to the chain surrounding the driven gear.

The rear fork of the bicycle includes gears for chain tensioning.

The bicycle according to the invention has a backrest positioned on a frame fixed on the rear fork.

When the front fork is attached to the second front mounting location and the rear fork is fixed to the second rear mounting location, the frame position is offset by an angle of 55° to 85° relative to the frame position when the front fork is attached to the first front mounting location and the rear fork is fixed in the first rear mounting location.

In the bicycle according to the invention, the position of the place for the cyclist relative to the frame defined by the position of the saddle and pedals in the upright configuration is the same as the position of the saddle for the cyclist determined by the position of the saddle, backrest and pedals in the recumbent configuration.

The advantage of the invention is the very short time of changing the configuration of the bicycle from one to another; in addition, changing the configuration of the bicycle does not require a complicated procedure for determining and checking the geometry of the connection of the bicycle components after changing the configuration. The bicycle is equipped with only two elements that are used only in one of the two configurations, namely the backrest and the extension element for the extension of the front fork. The bicycle according to the invention is lightweight and, in addition, changing one configuration to the other requires a short time of around 5 minutes.

Figure 2:
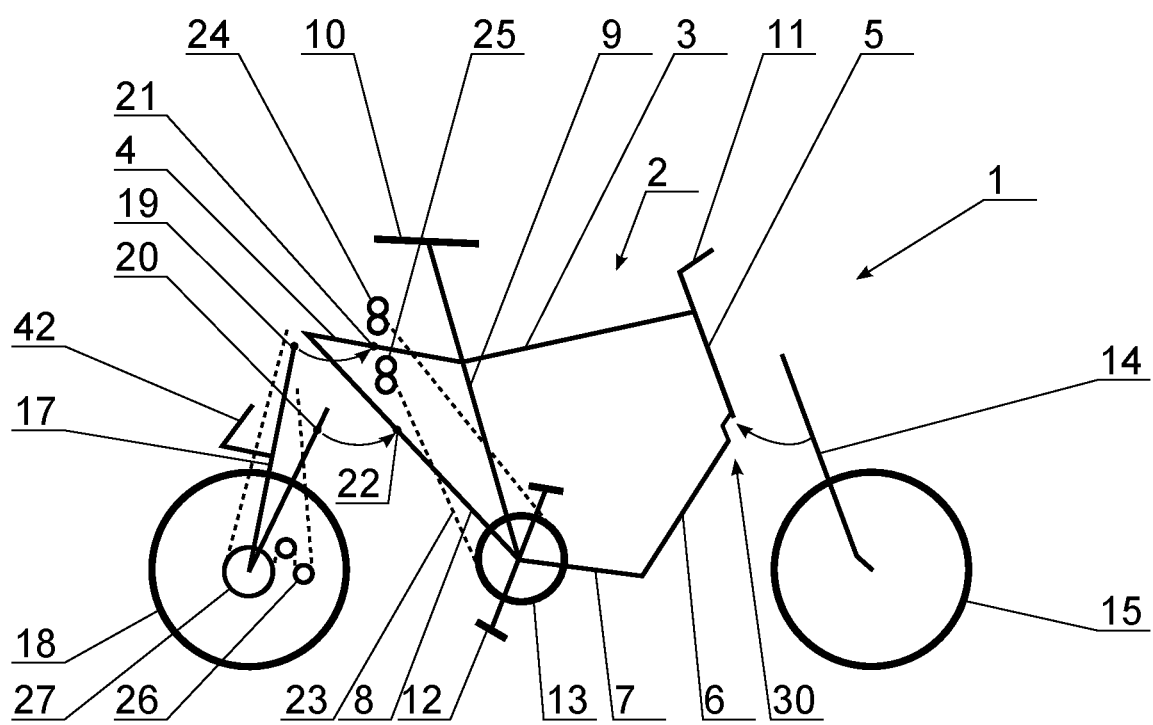
Figure 3:
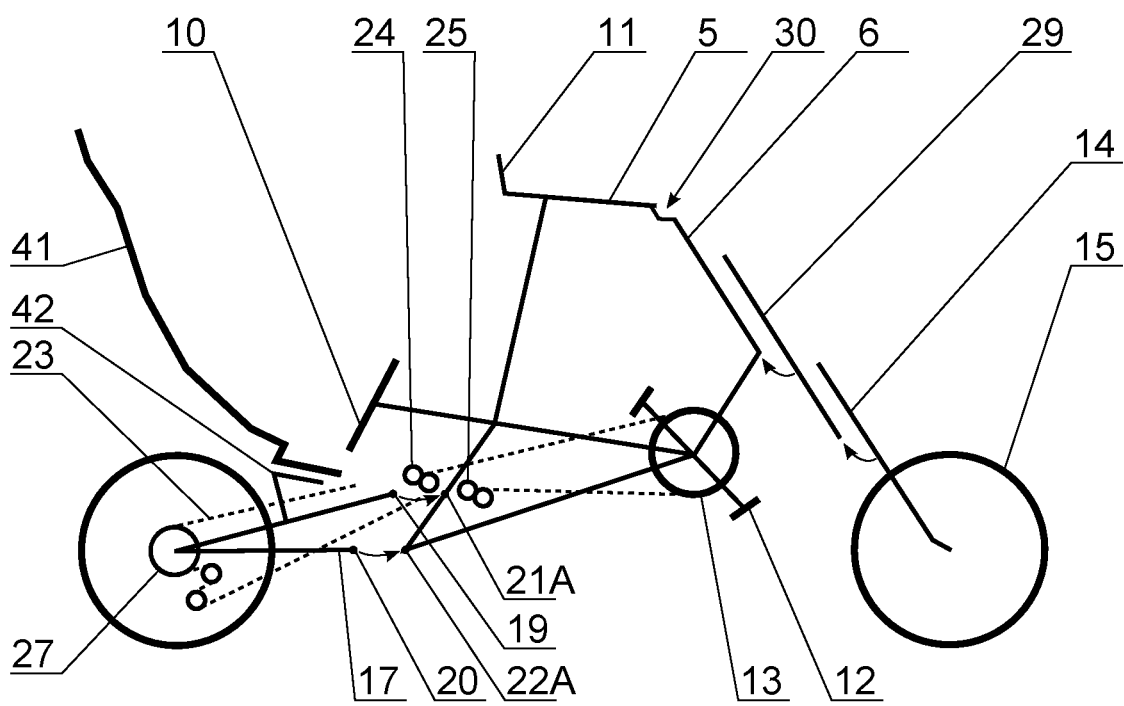
Figure 4:
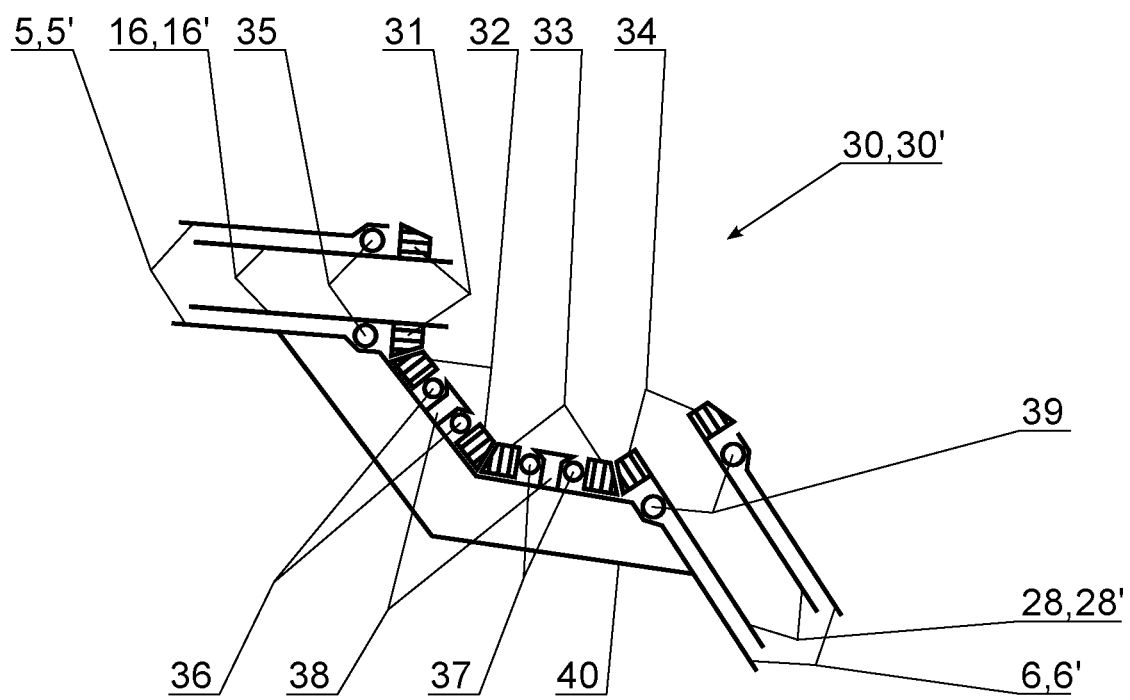

The subject of the invention has been described in the embodiment shown in the schematic drawing in which FIG. 1 shows the upright and recumbent configurations of the bicycle in the first embodiment of the invention together with the figure of the cyclist shown, FIG. 2 shows the bicycle of FIG. 1 in an upright configuration, the front wheel with the front fork and the rear wheel with the rear fork are in a position such as for a ride, but moved away from the frame, FIG. 3 shows the bicycle of FIG. 1 in the recumbent configuration, wherein the front wheel with the front fork and the extension piece, as well as the rear wheel with the rear fork are in a position such as for a ride, but moved away from the frame, FIG. 4 is a simplified cross-section view through the coupling mechanism of the bicycle of FIG. 1

Figure 5:
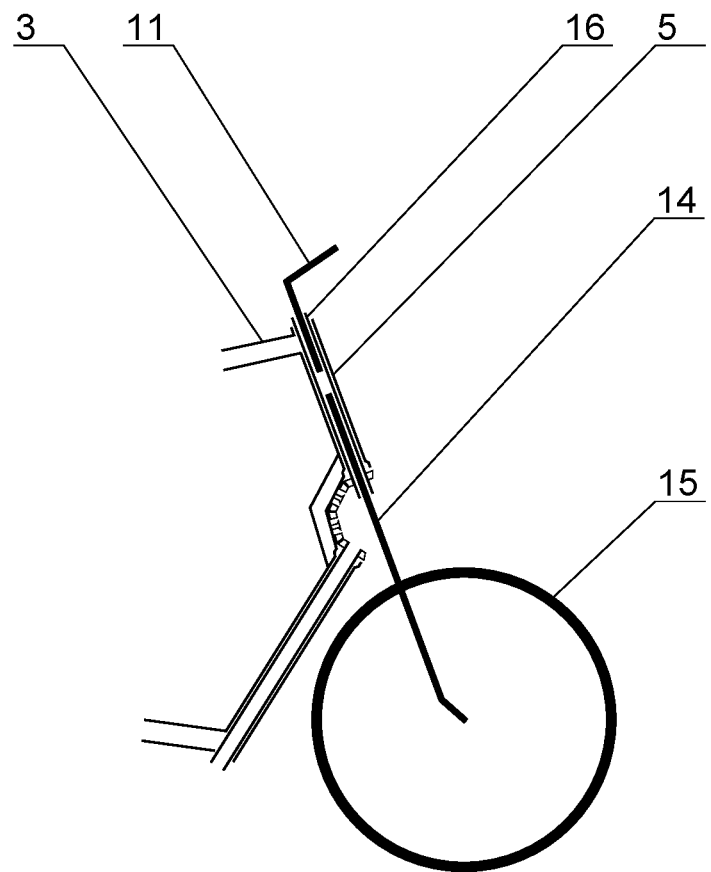
Figure 6:
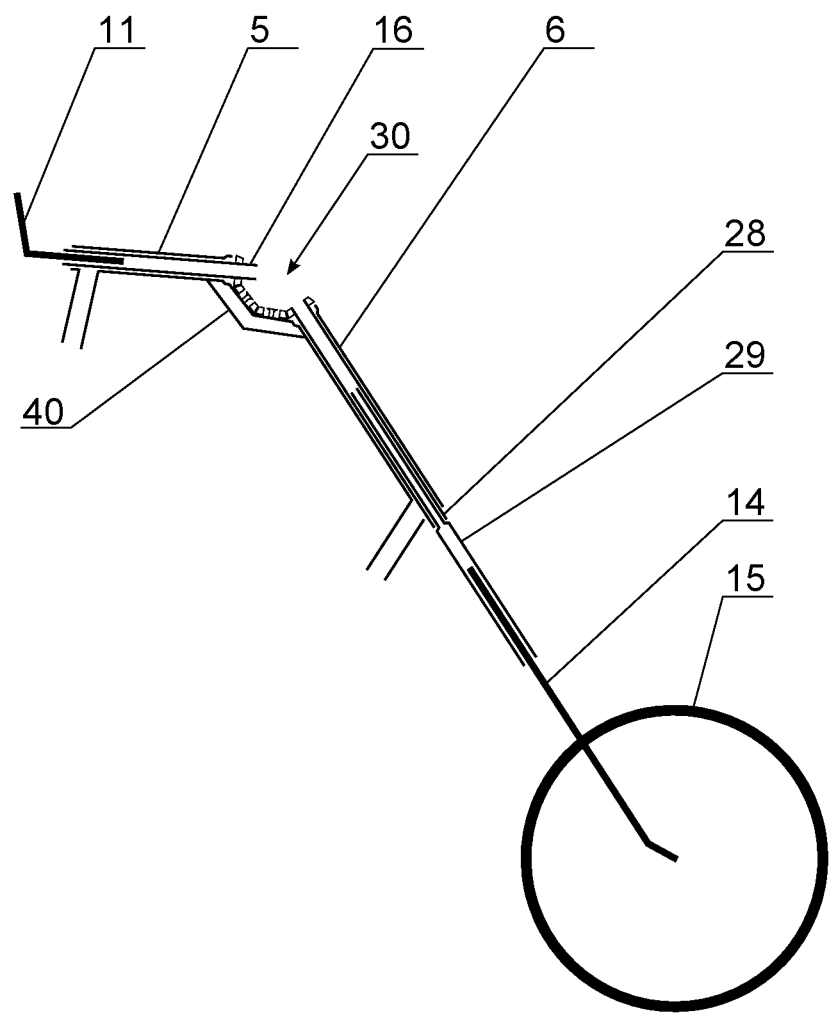
Figure 7:
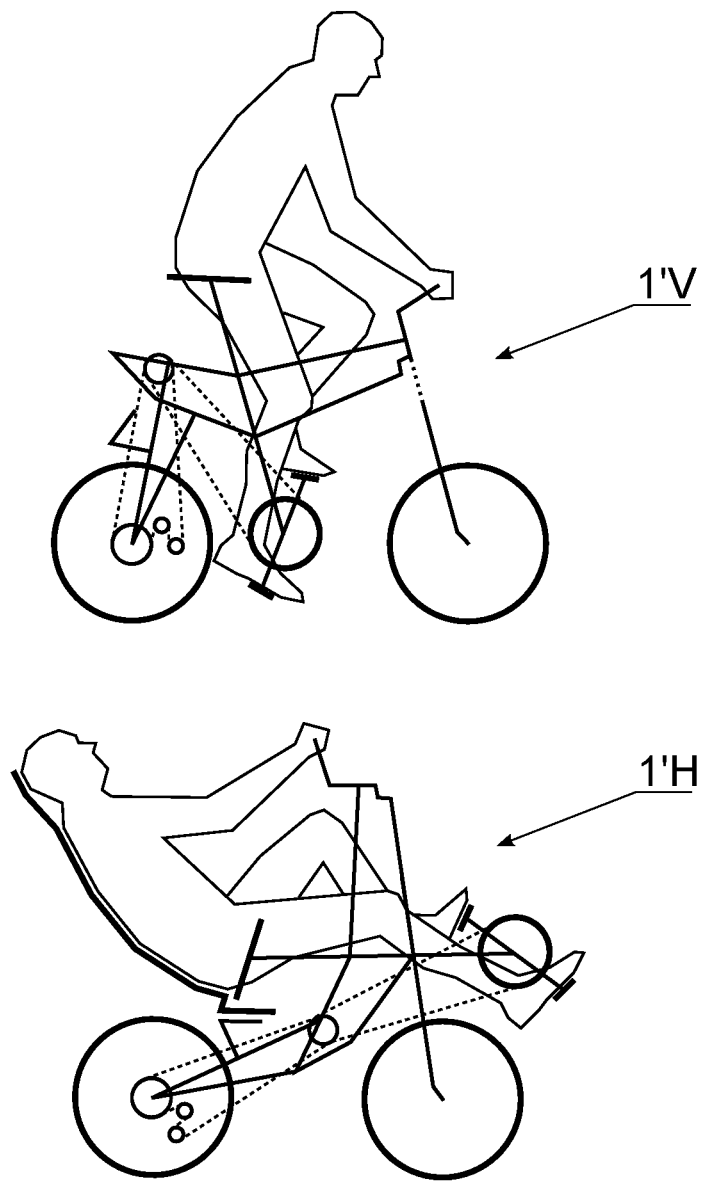
Figure 8:
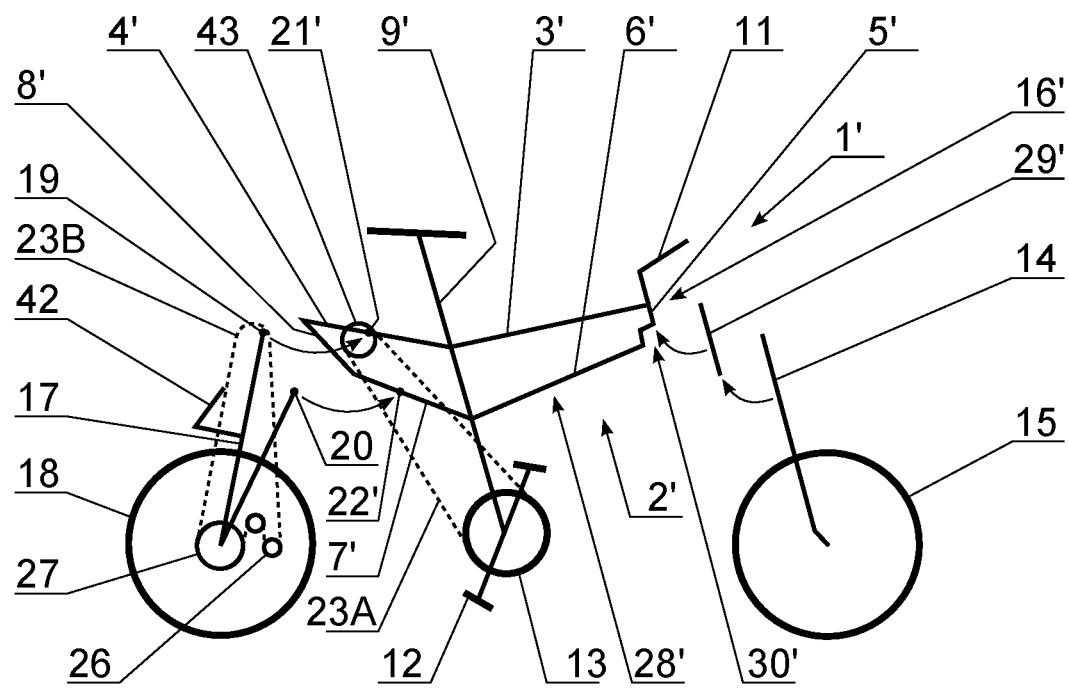
Figure 9:
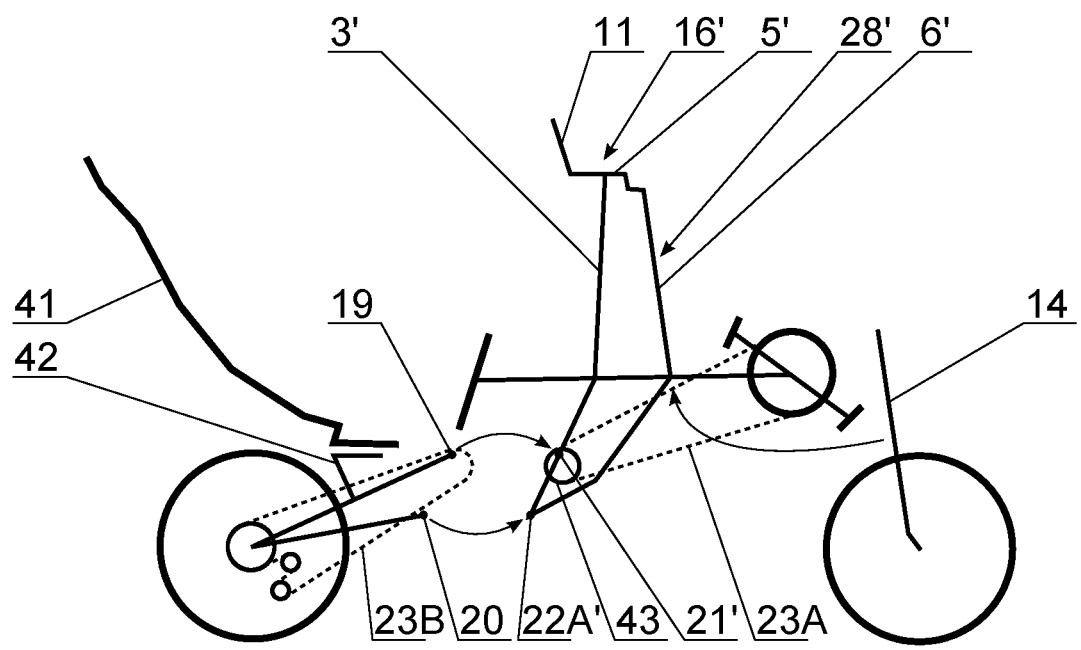
Figure 10:
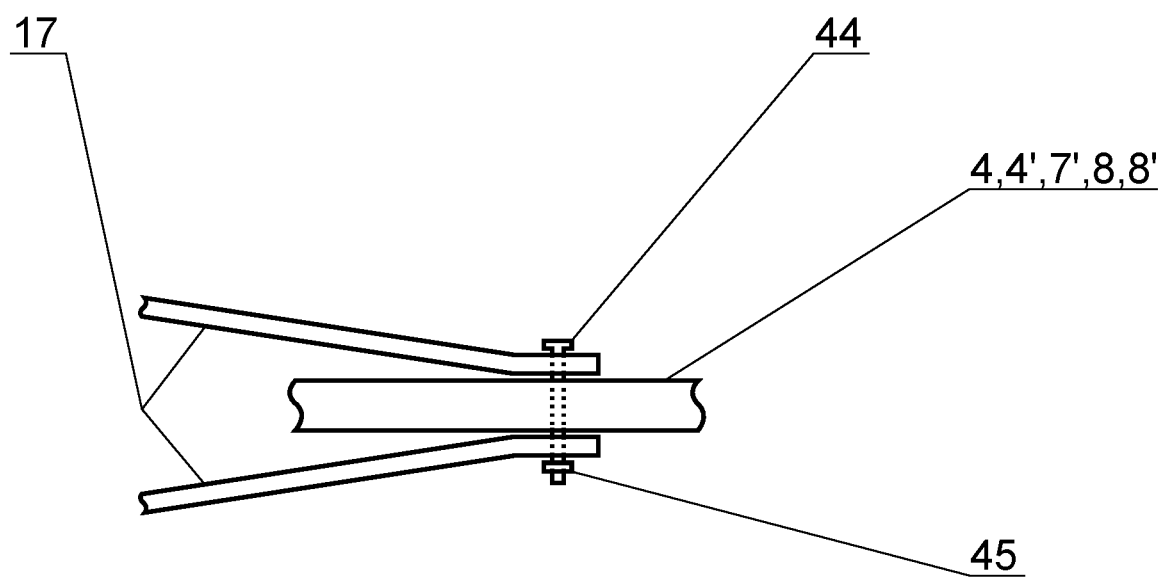

FIG. 5 is a simplified cross-section view through the coupling mechanism of FIG. 4 and rotary elements of the steering mechanism in the upright configuration, FIG. 6 is a simplified cross-section view through the coupling mechanism of FIG. 4 and rotary elements of the steering mechanism in the recumbent configuration, FIG. 7 shows the upright and recumbent configuration of the bicycle in the second embodiment of the invention together with the figure of the cyclist shown, FIG. 8 shows the bicycle of FIG. 7 in an upright configuration, wherein the front wheel with the front fork and the rear wheel with the rear fork are in a position, such as for a ride, but moved away from the frame, FIG. 9 shows the bicycle of FIG. 7 in a recumbent configuration, wherein the front wheel with the front fork and the rear wheel with the rear fork are in a position, such as for a ride, but moved away from the frame, FIG. 10 is a simplified cross section view through the rear fork.

The bicycle according to the invention is a two-wheeled one-person bicycle. FIG. 1 shows the two configurations of the bicycle 1 in the first embodiment of the invention according to the invention. The bicycle has been designed so that the position of the cyclist sitting on the bicycle is the same relative to the frame in both 1V upright configuration and 1H recumbent bicycle configuration, wherein in the 1H recumbent configuration the backrest of the cyclist is screwed onto the frame, while the front wheel with the front fork and the rear wheel with the rear fork have their positions changed relative to the frame in relation to the 1V upright configuration; moreover, an extension element is used to fasten the front fork in the recumbent 1H configuration. The position of the cyclist relative to the frame is determined by the position of the place for the cyclist as determined by the saddle and pedals in the upright configuration and by the saddle, backrest and pedals in the recumbent configuration.

The frame has two front mounting locations for attaching the front fork and two rear mounting locations for attaching the rear fork. In the 1V upright configuration, the front fork is attached to the first front mounting location, and the rear fork is attached to the first rear mounting location. In the 1H recumbent configuration, the front fork is attached to the second front mounting location by means of the extension element, and the rear fork is fixed in the second rear mounting location.

The bicycle frame 2 of bicycle 1 comprises the upper parts—front 3 and rear 4, frontal parts—upper 5 and lower 6, lower part 7, rear part 8 and saddle bottom part 9 (FIG. 2). Most often the bicycle frame is made of tubes, which is why in the following description the parts of the frame will be interchangeably referred to as tubes. In the saddle bottom part 9 mounted are the drive gear 13 and the hub with the pedals 12 mounted on the cranks. The saddle 10 is mounted on the saddle tube 9. The handlebar 11 of the steering mechanism is mounted in the frame 2, the handlebar 11 is rotatably mounted in the tube 5. The front fork 14 has two front mounting locations provided on the steering mechanism, which includes the handlebar and the swivel elements together with the bearing mounted in the frame 2. In the 1V upright configuration of the bicycle 1, the front fork 14 of the front wheel 15 is rigidly connected directly to the handlebar 11 by means of the first rotary element 16 (FIG. 5). The first rotary element 16, for example, in the form of a tube, is rotatably mounted in the tube 5 and is connected to a coupling mechanism 30 which will be discussed in the following part of the description. The handlebar 11 is rigidly connected with the first rotary element 16 and the fork 14 by means of clamps or screws. The rear fork 17, together with the rear wheel 18, has two rear mounting locations at the rear of the frame 2, being fastened in which it occupies two different positions relative to the frame 2. In the 1V upright configuration, the rear fork 17 is rigidly connected to the frame 2, namely to the rear horizontal tube 4 and the rear tube 8. In the 1V upright configuration, the mounting points 19, 20 on the rear fork 17 are connected to the assembly points 21, 22 on the tubes 4 and 8, which constitute the first rear attachment place for the rear fork 17. Said mounting points can be connected with screws. The chain 23 is shown with a dashed line, the chain 23 being separated in the drawing for the purpose of the assembly presentation, such that, both within the frame 2 and within the rear fork 17, it runs as if the rear fork 17 and the frame 2 were connected. The chain 23 is guided by means of gears 24 and 25 permanently fixed to the frame 2, wherein the gears 24 support the chain 23 from above and the gears 25 support the chain 23 from below. The chain 23 surrounds the driven gear 27 and, in addition, on the rear fork 17, the chain 23 is guided by gears 26, The arrangement of the gears 24, 25, 26 ensures proper guidance and tension of the chain 23 for both bicycle configurations.

In the recumbent configuration 1H of the bicycle 1, the front fork 14 is rigidly connected to the second rotary element 28 indirectly by means of the extension element 29 (FIG. 3), i.e. the rotary element 28 is the second front mounting location for the front fork 14. The second rotary element 28 is connected to the coupling mechanism 30. The extension element 29 can be made of two tubes with diameters adapted to be connected to the rotary element 28 and the front fork 14. The second rotary element 28, for example, a tube, is rotatably mounted in the tube 6 of the frame 2 (FIG. 6), the tube 6 being connected to the tube 5 by means of a connector 40. The first rotary element 16 and the second rotary element 28, located further away from the handlebar, are operatively connected by means of a coupling mechanism 30. The coupling mechanism 30 ensures that the rotational movement of the handlebar 11 is transferred to the second rotary element 28 and thereto connected the extension element 29 and the front fork 14, and, thereby, to the wheel 15, In the embodiment shown in FIG. 4, the coupling mechanism 30 is constructed as a tethered gear provided with tethered bevel gears 31, 32, 33 and 34. The gear 31 is fixedly connected to the first rotary element 16 mounted on the bearing 35 and a second bearing, not shown, the gears 32 and 33 are rotatably mounted on bearings 36, 37 set on the pins 38 mounted on the link 40, the gear 34 is permanently connected to the rotary element 28 mounted on a bearing 39 and a second bearing, not shown.

The bicycle frame in the recumbent 1H configuration is rotated backwards (in the counter-clockwise direction in the figure) in relation to the 1V upright configuration by an angle of 65°. The rear fork 17 is connected by assembly points 19, 20 to the assembly points 21A, 22A which are the second rear mounting location on the frame 2. In the recumbent 1H configuration, the bicycle is equipped with a backrest 41 which is attached to the frame 42 connected permanently to the rear fork 17. In the 1V upright configuration, the backrest 41 is not needed and is dismounted.

FIG. 7 shows the two configurations in the second embodiment of the bicycle 1' according to the invention. In this embodiment, the position of the cyclist sitting on the bicycle is also the same with respect to the frame in both the 1'V and 1'H upright configurations, with the cyclist's back support bolted to the frame in the 1'H recumbent configuration of the bicycle while the front wheel with the front fork and the rear wheel with the rear fork have changed positions relative to the frame. In the 1'V upright configuration, the front fork is attached to the first front mounting location by means of the extension element, and the rear fork is fixed in the first rear mounting location. In the 1'H recumbent configuration, the front fork is attached to the second front mounting location and the rear fork is attached to the second rear mounting location.

The frame 2' of the bicycle 1' (FIG. 8) is built in a manner analogous to the frame 2 of the bicycle 1; however, the proportions and lengths of the tubes used are changed. The frame 2' comprises upper parts—the front upper part 3' and the rear upper part 4', front parts—the upper front part 5' and bottom front part 6', the bottom part 7', the rear part 8' and the saddle bottom part 9'. Further down in the description, the frame parts will be interchangeably called tubes. The saddle 10 is mounted on the saddle bottom part 9'. In the saddle bottom part 9' of the frame 2', the hub is mounted together with the pedals 12 mounted on the cranks and the tethered drive gear 13. The handlebar 11 is mounted in the frame 2', the handlebar 11 is rotatably mounted in the tube 5'; in analogy to the first embodiment, the tube 5' is connected to the coupling mechanism 30' (FIG. 8), the lengths and ratios of the rotary elements 16' and 28' are changed in relation to the first embodiment. In the 1'V upright configuration, the front fork 14 of the front wheel 15 is rigidly connected to the handlebar 11 by means of the first rotary element 16' (FIG. 8) shorter than the element 16 in the first embodiment. The front fork 14 is indirectly connected to the first rotary element 16' by means of the extension element 29'. The first rotary element 16' provides the first front mounting location and is rotatably mounted in the tube 5'. The handlebar 11, the front fork 14, the rotary element 16' and the extension element 29' can be connected to one another by means of clamps or can be screwed together one to another. The rear fork 17 of the rear wheel 18 is connected to the frame 2', wherein the rear fork 17 is similarly provided with two rear mounting locations in which the rear fork 17 occupies two different positions with respect to the frame 2' in each configuration. In the 1'V upright configuration, the mounting points 19, 20 on the rear fork 17 are connected to the mounting points 21', 22', respectively, on the tubes 4' and 7' which constitute the first rear mounting location. These mounting points can be connected with screws. To drive the bicycle, two chains 23A and 23B are shown by a dashed line, wherein the chains 23A and 23B both within the frame 2' and in the rear fork 17 run in FIG. 8 as if the rear fork 17 and the 2' frame were joined together. The course of the chain 23A and 23B is realized by means of a double pinion 43 mounted on the frame 2'. On the rear fork 17, the chain 23B is belted around the driven gear 27 and is guided by gears 26 to properly tension the chain 23B.

In the recumbent configuration 1'H of the bicycle 1' (FIG. 9), the front fork 14 is connected directly to the second rotary element 28' which provides the second front mounting location. The coupling mechanism 30' to which the first rotary element 16' and the second rotary element 28' are connected may have a structure as shown in FIG. 6. The rear fork 17 is mounted so that the mounting points 19 and 20 are connected to the mounting points 21' and 22A' on the frame which constitute the second rear mounting location for the rear fork 17.

The frame 2' of the bicycle 1' in the 1'H recumbent configuration is rotated backwards in relation to the 1'V upright configuration by an angle of 75° (on the figure in a counter-clockwise direction).

The method for attaching the rear fork to the frame 2, 2' is shown in cross-section view on FIG. 10, on which one can see the fork 17, the screw 44 passing through the respective mounting points (not marked) on the rear recumbent part 4, 4', the bottom part 7' or the rear part 8, 8' and the nut 45.

I claim:

1. A two-wheeled, variable configuration bicycle having a frame, a handlebar, a saddle, pedals with pedal cranks and a drive gear rotatably mounted on the frame, a front wheel mounted on the front fork, a rear wheel with a sprocket mounted on a rear fork, wherein the configuration of the bicycle includes the upright configuration and the recumbent configuration, and in recumbent configuration, the bicycle provides support for the back of the cyclist, characterized in that on the frame (2, 2') there are provided two front mounting locations for attaching the front fork (14), wherein the first front mounting location is provided for attaching the front fork (14) in the upright configuration, and the second front mounting location is provided for attaching the front fork (14) in the recumbent configuration, and on the frame (2, 2') there are further provided two rear mounting locations for attaching the rear fork (17), the first rear mounting location being provided for attaching the rear fork (17) in the upright configuration, and the second rear mounting location being provided for fastening the rear fork (17) in the recumbent configuration.

2. The bicycle as claimed in claim 1, wherein the steering mechanism is mounted on the frame (2, 2'), said steering mechanism comprising two rotary elements (16, 16'; 28, 28') coupled together by means of the coupling mechanism (30, 30'), wherein the first rotary element (16, 16') is rigidly connected to the handlebar (11) and constitutes the first front mounting location, whereas the second rotary element (28, 28') is located further away from the handlebar (11) than the first rotary element (16, 16') and constitutes the second front mounting location.

3. The bicycle as claimed in claim 2, wherein the coupling mechanism (30, 30') is in a form of a gearbox comprising bevel gears (31, 32, 33, 34).

4. The bicycle as claimed in claim 1, wherein, in one configuration, the front fork (14) is adapted to be fastened to one front mounting location (28, 16') indirectly by means of an extension element (29, 29') and, in the other configuration, the front fork (14) is adapted to be attached directly to the second front mounting location (16, 28').

5. The bicycle as claimed in claim 2, wherein the first front rotary element (16, 16') is in the form of a tube.

6. The bicycle as claimed in claim 2, wherein the second rotary element (28, 28') is in the form of a tube.

7. The bicycle as claimed in claim 4, wherein the extension element (29, 29') is in the form of a tube.

8. The bicycle as claimed in claim 2, wherein the first rotary element (16, 16') and the second rotary element (28, 28') are arranged at an angle relative one to another in the range of 30° to 90°.

9. A bicycle as claimed in claim 1, wherein the drive gear (13) is connected to the driven gear (27) by means of one chain (23), and gears (24, 25) are fastened to the frame (2) to change the running direction of the chain (23).

10. The bicycle as claimed in claim 9, wherein the drive gear (13) is connected to the driven gear (27) by means of two chains (23A, 23B), and wherein on the frame (2') there is fixed a double gear (43) for transferring the drive from the chain (23A) that surrounds the drive gear (13) onto the chain (23B) that surrounds the driven gear (27).

11. The bicycle as claimed in claim 1, wherein the rear fork (17) comprises gears (26) for tensioning the chain (23, 23B).

12. The bicycle as claimed in claim 1, wherein it has a backrest (41) provided on the frame (42) attached to the rear fork (17).

13. The bicycle as claimed in claim 1, wherein when the front fork (14) is fixed to the second front mounting location and the rear fork (17) is fixed to the second rear mounting location, the position of the frame (1, 1') is reset by an angle in the range of 55° to 85° relative to the frame position wherein the front fork (14) is attached to the first front mounting location and the rear fork (17) is fastened to the first rear mounting location.

14. The bicycle as claimed in claim 13, wherein the position of the place for the cyclist relative to the frame as determined by the saddle and pedal position in the upright configuration is the same as the position of the place for the cyclist as determined by the position of the saddle, backrest and pedals in a recumbent configuration.

\* \* \* \* \*